(12) United States Patent
Nakamura et al.

(10) Patent No.: US 8,474,519 B2
(45) Date of Patent: Jul. 2, 2013

(54) METHANE HYDRATE DISSOCIATION ACCELERATING AND METHANE GAS DERIVING SYSTEM

(75) Inventors: Masahiro Nakamura, Chuo-ku (JP); Saburo Goto, Chuo-ku (JP); Takeyoshi Nozawa, Chuo-ku (JP); Kozo Ishida, Chuo-ku (JP)

(73) Assignees: Japan Drilling Co., Ltd., Tokyo (JP); Japan Oil, Gas and Metals National Corporation, Kawasaki-Shi (JP)

( * ) Notice: Subject to any disclaimer, the term of this patent is extended or adjusted under 35 U.S.C. 154(b) by 338 days.

(21) Appl. No.: 12/452,572

(22) PCT Filed: Jul. 14, 2008

(86) PCT No.: PCT/JP2008/062680
§ 371 (c)(1),
(2), (4) Date: Jan. 26, 2010

(87) PCT Pub. No.: WO2009/016948
PCT Pub. Date: Feb. 5, 2009

(65) Prior Publication Data
US 2010/0132933 A1 Jun. 3, 2010

(30) Foreign Application Priority Data
Jul. 27, 2007 (JP) ................................ 2007-196650

(51) Int. Cl.
*E21B 36/00* (2006.01)
(52) U.S. Cl.
USPC ........................................................ 166/57
(58) Field of Classification Search
None
See application file for complete search history.

(56) References Cited

U.S. PATENT DOCUMENTS

| 4,211,613 | A | * | 7/1980 | Meckler ........................... 203/11 |
| 4,262,747 | A | * | 4/1981 | Elliott et al. .................. 166/297 |
| 5,261,490 | A | | 11/1993 | Ebinuma |
| 6,016,873 | A | * | 1/2000 | Hsu et al. ....................... 166/402 |
| 7,472,548 | B2 | * | 1/2009 | Meksvanh et al. ........... 60/641.2 |
| 2006/0032637 | A1 | * | 2/2006 | Ayoub et al. ................... 166/369 |
| 2007/0223999 | A1 | * | 9/2007 | Curlett ............................ 405/55 |

FOREIGN PATENT DOCUMENTS

| JP | A 2-236391 | 9/1990 |
| JP | A-5-25986 | 2/1993 |
| JP | A 9-158662 | 6/1997 |
| JP | A-2005-60957 | 3/2005 |
| JP | A 2005-213824 | 8/2005 |
| JP | A 2006-045128 | 2/2006 |
| RU | 2 159 323 C1 | 11/2000 |

(Continued)

OTHER PUBLICATIONS

Feb. 18, 2010 Notification of Transmittal of Translation of the International Preliminary Report on Patentability issued in International Application No. PCT/JP2008/062680.

(Continued)

*Primary Examiner* — Zakiya W Bates
*Assistant Examiner* — Silvana Runyan
(74) *Attorney, Agent, or Firm* — Oliff & Berridge, PLC (57) ABSTRACT

Warm water is pumped up by a pump from an underground aquifer present 1000 to 1500 m below the seabed, geothermal energy is caused to flow through a permeable layer below a methane hydrate layer, a dissociation boundary surface of an un-dissociated area of the methane hydrate layer is dissociated to generate methane gas, the methane gas is led into a production well from peripheral areas and through a gas inlet screen and caused to rise so that the methane gas is collected on the sea.

2 Claims, 8 Drawing Sheets

FOREIGN PATENT DOCUMENTS

RU             2 231 635 C1    6/2004
WO    WO 2006/002325 A2    1/2006

OTHER PUBLICATIONS

Oct. 28, 2008 Written Opinion issued in International Application No. PCT/JP2008/062680.

International Search Report issued in corresponding International Application PCT/JP2008/062680, mailed Oct. 28, 2008.

Dec. 1, 2011 Russian Office Action issued in Russian Patent Application No. 2010107154/03 (with translation).

\* cited by examiner

METHANE HYDRATE DISSOCIATION ACCELERATING AND METHANE GAS DERIVING SYSTEM

TECHNICAL FIELD

The present invention relates to a deriving system for methane hydrate.

BACKGROUND ART

Recent research and survey results report that it is possible that methane hydrate equivalent to a domestic gas consumption amount for 100 years is present in the area of sea around Japan. The methane hydrate is a potential resource that is abundantly present under the seabed of the deep sea and in which methane and water are solidified in a high pressure and low temperature state.

It is difficult to economically derive the methane hydrate with the present technology because productivity is low. However, on the premise that an inexpensive production method is developed and optimization of production behavior is realized, it is expected that a way of using the methane hydrate as a future energy source will be found.

As means for deriving methane gas from methane hydrate, a depressurization method and a heating method have been proposed. A combined method as a combination of the depressurization method and the heating method has also been examined as a basic concept.

A depressurization method is a technique for reducing the pressure of a methane hydrate layer, keeping methane hydrate to be in a dissociation zone, and deriving dissociated methane gas. (See, for example, Japanese Patent Application Laid-Open No. 2006-45128). This technique includes means for depressurizing a layer and means for collecting methane gas. The depressurization method does not consume fuel because an artificial heat source is unnecessary. (Natural heat transfer between layers is utilized.) Since a well for heating is also unnecessary, drilling cost can be substantially reduced. However, in the technique of the simple depressurization method, there are many characteristics that are obstacles in realizing commercialization, such as low supply speed of heat necessary for vaporization of methane hydrate, large amounts of discharged sand and water, presence of risks of re-hydration and freezing of a production fluid, and poor usage efficiency of a production facility due to a large change in production behavior.

A general heating method being researched is a method of injecting hot water into a methane hydrate layer under the seabed and dissolving methane hydrate to derive methane gas (See, for example, Japanese Patent Application Laid-Open No. 2005-21324).

In this technique, for example, a hot water producing apparatus is provided on a platform to heat the sea water and inject thermal energy into the methane hydrate layer through an injecting well. However, a large amount of development investment is necessary because a large quantity of fuel is consumed for the purpose of hot water production and the thermal energy is distributed to the methane hydrate layer through the injecting well.

A methane gas deriving method most prospective at the present point is the simple depressurization method. However, the method has the following problems that should be solved.

(A) Intensification of a depressurization degree is the one and only method of accelerating production, and intense depressurization is an absolute requirement. Therefore, there are risks of subsidence, cracking, and gas leakage of the seabed surface.

(B) Economic burden on an entire development system is large because risks of discharge of sand and water involved in the intense depressurization are high.

(C) Since the supply of heat is insufficient, there is concern of a sudden fall in productivity or a serious production failure such as re-hydration or freezing of the geology and the production flow channel.

(D) Since water is excessively sucked under an intense depressurization condition, water treatment cost increases, compaction of the methane hydrate layer is accelerated, and the permeability of a layer falls.

(E) The shape of a production behavior curve is undesirable and thus, an increase in sub-sea cost occupying most of methane hydrate development is inevitable.

(F) A recovery ratio is difficult to improve with a production behavior curve peculiar to the depressurization method.

DISCLOSURE OF THE INVENTION

The largest problem in the development of methane hydrate is poor economy. The largest sensitivity factor related to the economy is considered to be productivity. However, it is difficult to substantially improve the productivity with the simple depressurization method regarded as an effective production method at the present point.

A major cause that prevents a productivity improvement in the depressurization method is its insufficient ability of supplying heat. In a method that relies on only the depressurization method according to a relation between pressure and temperature in a phase equilibrium curve, since the heat supply speed is low, the temperature of a methane hydrate layer falls. Therefore, risks of a sudden fall in productivity, re-hydration of a production fluid, and freezing of a flow channel are inevitable.

Meanwhile, the heating method of the hot water injection system has such problems that a large quantity of fuel is required, it is technically difficult to inject warm water into the methane hydrate layer, and the cost is high.

The present invention attempts to eliminate the drawbacks of the depressurization method and the heating method and overcome the economical and technical difficulties in the development of methane hydrate. Specifically, the present invention attempts: to reduce development cost by, for example, suppressing the high-level discharge of sand and water, which is a characteristic of the depressurization method, leveling the productivity, and preventing re-hydration and freezing of a production flow channel; and on the other hand, to acquire a substantial improvement in economy by resolving a large amount of fuel consumption, which is a characteristic of the heating method of the hot water injection system.

In the present invention, it is possible to eliminate many obstacles originating from the depressurization method. Also, it is possible to use inexhaustible geothermal energy at low cost.

The present invention eliminates the above-described obstacles and problems caused by the depressurization method and is a methane hydrate dissociation accelerating and methane gas deriving system, characterized by including the following (a) through (d).

(a) a heating well for pumping up a heat medium from a deep aquifer.

This heating well is a well formed by drilling the seabed downward to about 1,000 to 1,500 m depth so as to derive geothermal energy by pumping up a heat medium heated by the ground heat of a deep aquifer, for example, warm water or hot water, and supply the heat medium to a methane hydrate layer.

(b) a production well for deriving methane gas.

This production well receives the supply of the geothermal energy and derives methane gas generated by dissociation of methane hydrate. A high-quality screen is provided in a position above the methane hydrate layer in order to prevent intrusion of sand into the well.

(c) a return well for returning the heat medium that has been subjected to heat exchange to the deep aquifer.

Like the heating well, this return well is formed by drilling the seabed downward to about 1,000 to 1,500 m depth. A purpose of the return well is to derive water cooled by being subjected to heat exchange near a dissociation boundary surface and returning this water to the deep aquifer.

(d) means for supplying the heat medium to a dissociation boundary surface of the methane hydrate.

This means is means for deriving the heat medium such as the warm water or the hot water from the deep aquifer and supplying geothermal energy of the heat medium to the methane hydrate layer. The means is composed of, for example, a pump apparatus, a flow rate adjusting apparatus and includes various measuring devices and a control device.

In the methane gas deriving system of the present invention, when the depressurization method is used in combination for the production well, productivity is facilitated. Dissociating means is composed of a seabed production system such as a separator (a separating apparatus for gas, water, and sand) or a booster pump (an apparatus for accelerating depressurization). When compared with the simple depressurization method, since supply speed of thermal energy is increased, it is possible to relax a depressurization degree.

The heating well may be a well formed by extending a lower end of the production well to the deep aquifer.

Also, the return well may be a well formed by extending a lower end of the production well to the deep aquifer. Consequently, the number of wells is halved and total development cost is remarkably reduced.

The present invention makes use of, as a heat source, the ground heat inexhaustibly present under the ground. Therefore, according to the present invention, the geothermal energy is stably supplied to the methane hydrate layer for a long period without requiring special fuel or the like. It is possible to realize expansion of a methane hydrate dissociation boundary surface by supplying sufficient heat quantity.

Compared with the heating method of the hot water injecting system, according to the present invention, not only the hot water producing apparatus and the enormous fuel cost but also a heating line from a platform on the sea to wells is unnecessary. Therefore, the present invention is free from a large amount of equipment cost burden related to hot water production on the platform and transportation to the wells.

According to the present invention, when the partially advantageous functions of the depressurization method and the heating method are used in combination and production control means in two systems are secured, it is possible to effectively perform heat exchange on the dissociation boundary surface below methane hydrate and simultaneously accelerate dissociation in a wide area. Therefore, it is possible to realize leveling of the production behavior curve, improvement of a recovery ratio, and improvement of average daily production. All of these have high effect of remedying economy.

In this case, since the dissociation of the methane hydrate is accelerated by heating, a depressurization degree of the depressurization method used in combination with the heating method can be reduced.

Since an intra-layer residual ratio of water is increased by the reduction in the depressurization degree, water treatment cost decreases. Moreover, since the compaction phenomenon of a layer is relaxed, it is possible to suppress the deterioration in permeability. The discharge of sand and water is a function of the depressurization degree. It is possible to reduce load on a production apparatus due to the discharge of sand and water by relaxing the depressurization degree and substantially reduce design specifications of a sub-sea system. Therefore, it is possible to expect a remarkable reduction in facility building cost.

According to the present invention, it is possible to suppress a temperature fall of a production fluid, which passes through the methane hydrate layer, the well bottom, and the production system, by continuously supplying the geothermal energy obtained from the deep aquifer to the methane hydrate layer for a long period. It is also possible to reduce cost of measures against re-hydration and freezing.

BEST MODE FOR CARRYING OUT THE INVENTION

When it is assumed that the depth of water is 1,000 m, seabed temperature is 4° C., and ground temperature gradient is 3 to 4° C./100 m, the ground temperature at 1,000 m below the seabed is expected to be 34 to 44° C. The depth limit of a riser-less drilling work is about 1,500 m below the seabed. The layer pressure is usually low up to near this depth and thus, it is considered that a riser-less low-pressure rotating BOP can be used. When the drilling proceeds deeper, since the full-scale BOP and the riser are necessary in view of safety measures, drilling cost suddenly increases. The limit depth of a deep aquifer that can be economically used is about 1,500 m below the seabed.

Therefore, concerning the deep aquifer that should be used, comparison and examination are performed in a range of 1,000 m to 1,500 m below the seabed and a sand layer having highest geothermal energy supply ability is selected. Although the drilling cost changes according to depth, since ground temperature gradient and depth gradient of the drilling cost offset each other, a difference that affects economy is very small in this range.

It is easier to secure a flow rate of a heat medium and a heat quantity supply amount increases as the thickness of the deep aquifer is larger. It is basically desirable that a usable reservoir for the heat medium is large.

According to the present invention, warm water in such a deep aquifer is pumped up by a pump mounted on a heating well and supplied to near a dissociation boundary surface in a lower part of a methane hydrate layer. An inexpensive single-phase down hole pump can be used as the pump.

The initial permeability of the methane hydrate layer is low. However, after a solid methane hydrate structure disappears, the permeability of the methane hydrate layer becomes high. Therefore, if the sand layer after the lower part of the methane hydrate layer reaches a dissociation condition zone is utilized as a heat exchange flow channel, power for causing the heat medium to flow is reduced. The lower end of the methane hydrate layer is originally under a condition of a dissociation boundary line.

Unless the permeability is improved to the level of absolute permeability, methane hydrate dissociation for the dissociation boundary surface is performed first according to the depressurization method. If the dissociation of the boundary surface begins and the permeability changes to the level of the absolute permeability, the heat exchange flow channel can be established.

It is predicted by a demonstrative experiment and the like that the sand layer having high permeability is present near the dissociation boundary surface in the lower part of the methane hydrate layer. Main uncertainty resides in non-uniformity between a fault and flow resistance.

According to basic knowledge related to the basic drilling and the conventional oil and gas development, the absolute permeability near the dissociation boundary surface in the lower part of the methane hydrate layer is 200 md to 1 d in the horizontal direction. The absolute permeability of a mud layer is several 0 to 0.7 md. It is expected that the methane hydrate layer is a sand and mud alternate layer. Water hardly flows to an upper layer.

If it is difficult to circulate a heat medium in a set range of pressure, the pump is started after the solid methane hydrate structure completely disappears and water permeability near the boundary surface is secured. Therefore, it is advisable to mount a differential pressure switch on the pump.

For example, when the depth of water is 1,000 m, if the depressurization method is used, the temperature of a methane hydrate accumulation layer near 300 m below the seabed is about 14° C. and, even if not depressurized, methane hydrate enters a dissociation zone at about 16° C. The heat medium subjected to heat exchange is returned to the deep sand layer by the pump mounted on the return well. Consequently, accumulation of water is prevented from occurring in the methane hydrate layer and a pressure increase in the layer as a potential trouble factor is prevented.

The structure of the heating well and the return well is simplified as described later. Pipes are not provided in the wells. Apparatuses inserted therein have structures in which collection and repairing are possible by performing lifting and lowering work once (one trip) using a wire line. This realizes workover using a work boat instead of an expensive drilling rig.

The methane hydrate layer generates free methane gas and water through dissociation. First, emulsion occupies most part of the methane hydrate layer. However, because of heterogeneity of geology and the intervention of a micro-fracture, a small fault, or the like, gravity control is accelerated as time elapses. When water and sand are produced, production cost is markedly increases. Therefore, to prevent the increase, it is effective to suppress a depressurization degree of the depressurization method and accelerate gravity separation of gas and water in the layer and the well bottom.

It is difficult to selectively produce only gas under an intense depressurization condition. However, a gas to water ratio of a production fluid is evidently improved by weakening the depressurization degree. Therefore, it is possible to expect substantial suppression of a discharge amount of sand and water. The reduction in the discharge amount of sand and water is extremely effective for a reduction in development cost mainly including sub-sea cost.

Expansion of the dissociation boundary surface is quickened, productivity is temporally leveled, and improvement of a recovery ratio can be performed by directly supplying the geothermal energy in the depth to the dissociation boundary surface. Further, since the temperature of the production fluid rises, the risk of hydration or freezing of the methane hydrate layer and the flow channel is reduced.

On the other hand, it is expected that the pressure of the methane hydrate layer increases to some extent according to the dissociation of the methane hydrate, In the heating method for injecting hot water, since injected water is accumulated in the methane hydrate layer, layer pressure is further markedly increased. Therefore, a risk of damage to a seal layer increases. Further, the depressurization effect is hindered. Moreover, an amount of production water increases and economy deteriorates.

A system according to the present invention realizes intralayer circulation of the heat medium and uses the sand layer in the lower part of the methane hydrate as the heat exchange flow channel. Therefore, it is possible to minimize the risk of damage to the seal layer.

Various conditions affect the flow of dissociation gas. However, a reduction of a gas to water ratio and a water to sand ratio of the production fluid is directly connected to improvement of economy. For the purpose of the improvement of economy, a screen for the production gas is arranged in an upper part of the methane hydrate layer and a circulating port for the heat medium is arranged in a lower part of the methane hydrate layer. In realizing improvement of production cost, production of an intermediate layer (emulsion) with insufficient separation of gas and water is undesirable. Therefore, positions of an inlet for methane gas and the circulating port for the heat medium are vertically separated as far as possible to further realize suppression of the depressurization degree.

According to the improvement of a methane hydrate dissociation ratio through the combined use of heating and depressurization, it is possible to realize an increase in average daily production of a production well and improvement of a recovery ratio. The leveling of productivity and the reduction in the discharge amount of sand and water enables simplification of design specifications of the producing system and is extremely effective in reducing facility building cost. According to the present invention, substantial improvement of economy can be expected through synergetic effect of these effects.

An embodiment of the present invention will be described below with reference to the drawings.

Figure 1:
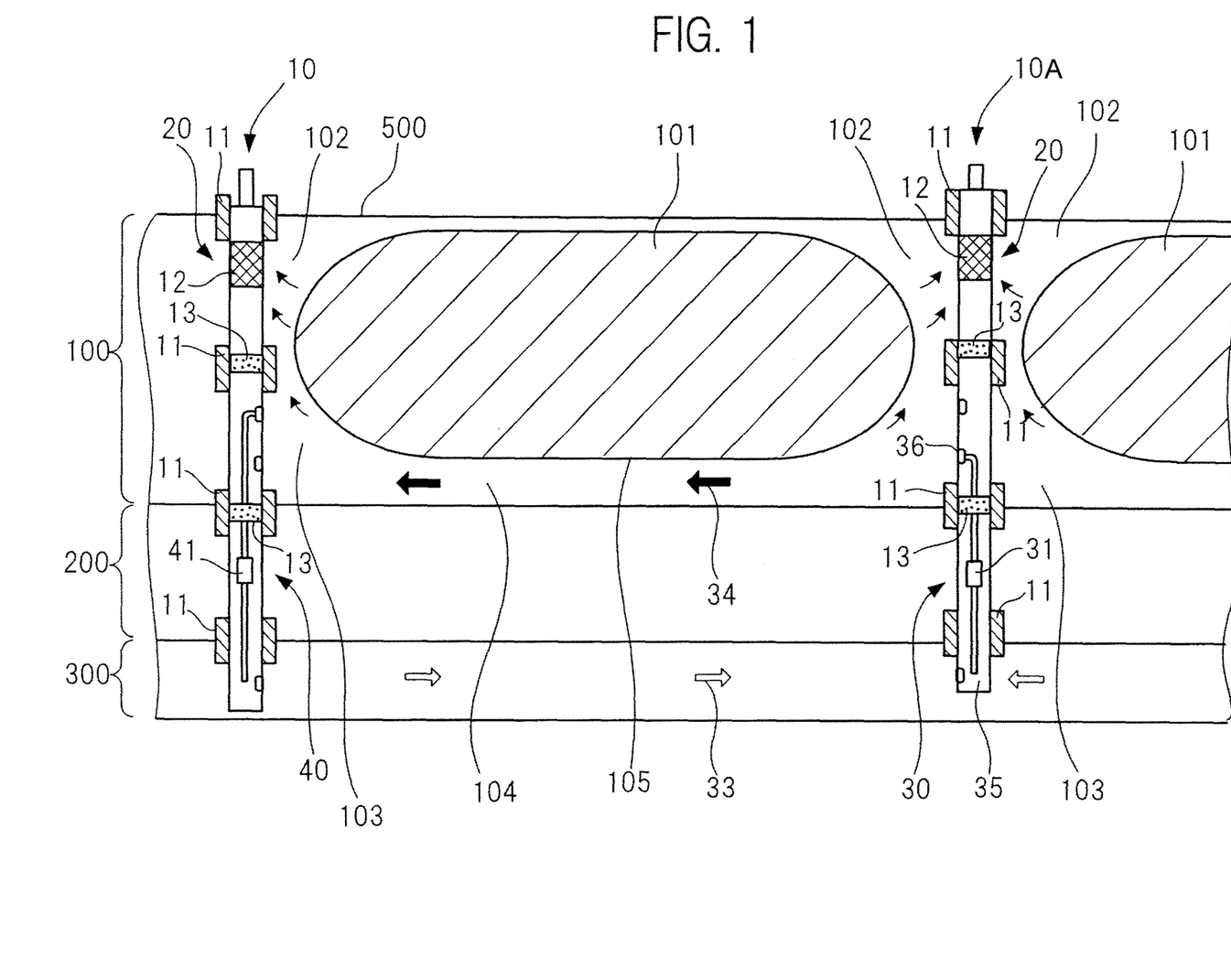
FIG. 1 is a conceptual diagram of a methane gas producing system according to an embodiment of the present invention.

FIG. 1 shows a schematic diagram of a methane gas producing system in methane hydrate development according to the present invention. A methane hydrate layer 100, a methane hydrate unsaturated layer 200, and a deep aquifer 300 are present below a top 500 of the methane hydrate layer.

A well 10A on the right in FIG. 1 is a well obtained by vertically integrating a production well 20 and a heating well 30. This well pierces through the methane hydrate unsaturated layer 200 present below the methane hydrate layer 100 and pumps up a heat medium from the deep aquifer 300 below the methane hydrate unsaturated layer 200. An increase in drilling cost is prevented by vertically integrating the production well 20 and the heating well 30. In the well 10A, a cement injecting section 11 is formed in a layer gap in a necessary section to realize stability.

In the production well 20, a gas inlet screen 12 is set in an upper part and a packer 13 is set in the middle. The gas inlet screen 12 is set in an upper part of the methane hydrate layer 100, secures draw-down to take in dissociated gas in the methane hydrate layer 100, causes the gas to rise in the well 10A, and collects the gas on the sea. The packer 13 separates flow channels for the production gas and the heat medium.

The heating well 30 pumps up the heat medium from the deep aquifer 300 and continuously supplies the heat medium to a dissociation boundary surface 105 of the methane hydrate layer 100. Therefore, the heating well 30 includes a pumping-up pump 31 and the like.

An un-dissociated area (solid phase) 101 in the methane hydrate layer is sequentially dissociated from peripheral sections 102 and 103 of the well by heating and changes to a dissociated phase of methane gas and water. Water and sand are gradually separated and reduced by the gravity. The production fluid mainly containing methane gas is led into a collection line for gas through the gas inlet screen provided in the upper part of the production well.

The flow of the heat medium in the layer is controlled according to layer pressure, layer gradient, temperature, draw-down, gravity, permeability, and the like. The heat medium flows in a permeable layer 104 in a lower part of the methane hydrate layer as indicated by an arrow 34 and directly heats the methane hydrate dissociation boundary surface 105 in the lower part of the un-dissociated area (solid phase) 101.

The well 10 shown on the left in FIG. 1 includes the production well 20 in an upper part and includes a return well 40 in a lower part. The structure and functions of the production well 20 are the same as those described above. The return well 40 is provided to reach from the lower end of the methane hydrate layer 100 to the deep aquifer 300. The return well 40 returns, to the deep aquifer 300, the heat medium that has been subjected to heat exchange in a process of passing near the methane hydrate dissociation boundary surface 105. According to the actuation of a pump 41, for example, layer pressure near the lower end of the return well 40 rises by about 3 MPa. Therefore, pressure gradient occurs in the deep aquifer 300 and water flows in a direction of an arrow 33. The cooled heat medium absorbs sufficient geothermal energy while flowing through the deep aquifer 300. The temperature of the heat medium rises to near the original ground temperature again.

The fluid pressure of the deep aquifer 300 is generally under a peculiar layer pressure condition. Thereafter, the heat medium flows into a sump 35 of the heating well 30 while accumulating thermal energy according to occurrence of draw-down. The heat medium stored in the sump 35 is pumped up by the pump 31 and discharged from a port 36 near the methane hydrate dissociation boundary surface 105.

The heat medium discharged to near the dissociation boundary surface 105 in the lower part of the methane hydrate layer flows through the sand layer 104 having high absolute permeability. The heat medium flows as indicated with an arrow 34, by using boosting pressure of the pump 31 as a main power source. Boosting pressure of the pumps 31 and 41 varies depending on a condition, but it is assumed to be, for example, about 3 MPa.

Heat exchange is performed between the heat medium and the methane hydrate layer while the heat medium flows in the sand layer 104 in the lower part of the methane hydrate layer 100. The heat medium having emitted thermal energy is sucked by the pump 41 of the return well 40. Therefore, draw-down of about 6 MPa can be secured between the pumps 31 and 41. The circulation of the heat medium between the deep aquifer 300 and the methane hydrate layer 100 is continued for a long period by using the draw-down formed by the pumps 31 and 41 as main power.

In the methane gas collecting system according to the embodiment of the present invention, since a circulation loop for circulating the heat medium in the ground is a basis, a pressure difference between the methane hydrate layer 100 and the deep aquifer 300 does not increase.

Since forcible warm water injection in the heating method of the hot water injection system is not performed, accumulation of formation water can be prevented. Therefore, the risk of causing a pressure rise in the layer is small, thereby reducing the risk of causing damage to a seal. Consequently, safety is improved and, at the same time, cost for measures against subsidence of the seabed surface and compaction can be reduced.

Conceptually, the methane gas collecting system according to the present invention can use depressurization and heating in combination. Consequently, since reduction in the depressurization degree is possible compared with the simple depressurization method in the past, the risk of discharge of sand and water is reduced. The methane hydrate un-dissociated area 101 is reduced by the dissociation of the methane hydrate. However, the progress of the dissociation boundary surface by depressurization hardly proceeds near the center of the un-dissociated area 101. Sections where the progress of a dissociated surface precedes are near the upper and lower peripheral areas 102 and 103 of the un-dissociated area 101. Dissociation speed is low in the area 102 at the upper end because a supply amount of heat is small.

In the depressurization method in the past, heat supply ability necessary for acceleration of methane hydrate dissociation is insufficient near the lower boundary surface 105. The methane gas collecting system according to the present invention artificially circulates geothermal warm water in the depth to the sand layer 104 near such a lower boundary surface 105, where the heat supply ability is insufficient, and directly performs heat exchange using a high temperature difference between layers.

Compared with the production well 20 on the left, the production well 20 on the right in FIG. 1 can lower a gas to water ratio by weakening the depressurization degree to some extent. Since the well is located on an upstream side of geothermal circulation water, a supply amount of thermal energy is larger. It is interpreted that, since the depressurization degree and the level of the effect of the heat exchange are offset, productivities of the left and right wells are analogous to each other.

The methane gas collecting system according to the present invention circulates the heat medium in a layer to thereby directly supply geothermal energy to the dissociation boundary surface of the methane hydrate. The success and failure thereof substantially depends on a flow rate of the heat medium and fluidity thereof.

Therefore, it was verified as far as possible whether a circulation amount of the heat medium necessary for dissociation of the methane hydrate could be secured. Geological conditions were regarded as uniform and the Darcy's law was applied.

As a calculation formula for an ability to collect oil (water) using a column, the following formula was used.

Calculation Formula:

$$Q = 2 \times PI(\,) \times k \times h \times 100 \times \Delta P / 1.03323 / \mu / LN(r_e/r_w)$$

where, PI( ): π, k: absolute permeability=300 mdrcy, h: thickness of a reservoir=17.6 m, ΔP: differential pressure=3 MPa, μ: viscosity=1.00 cp, $r_e$: reservoir radius=180 m, and $r_w$: well radius=17.8 cm. As a result, the ability to collect water in the pump was calculated as about 1202 m³/d.

On the other hand, calculation of a heat quantity and a flow rate necessary for securing specified daily production was performed.

As a result, a heat medium quantity, which is necessary when productivity of a well was set to 40,000 m³/d, a temperature difference before and after heat exchange near the dissociation boundary surface was set to 20° C., heat efficiency was set to 100%, and dissociation dependency on the heating method was set to 20%, was calculated as about 254 m³/day/well. If the heat efficiency of the entire system is regarded as 30%, the necessary heat medium quantity is about 846 m³/day/well.

According to results of the calculation described above and another calculation, it was interpreted that it was sufficiently possible to circulate geothermal energy necessary for maintaining productivity. If the productivity of a well is equal to or lower than 40,000 m³/day, the necessary heat quantity further decreases and the available power increases.

A pump set in the heating well does not have an obstacle against securing a heat medium quantity as long as a deep aquifer having high permeability is present. Also, it is easy to use plural deep sand layers as heat sources.

It is interpreted that a latest down-hole pump has boosting power and discharge power necessary for circulating the heat medium in a layer and both have available power of about 100%.

Figure 2:
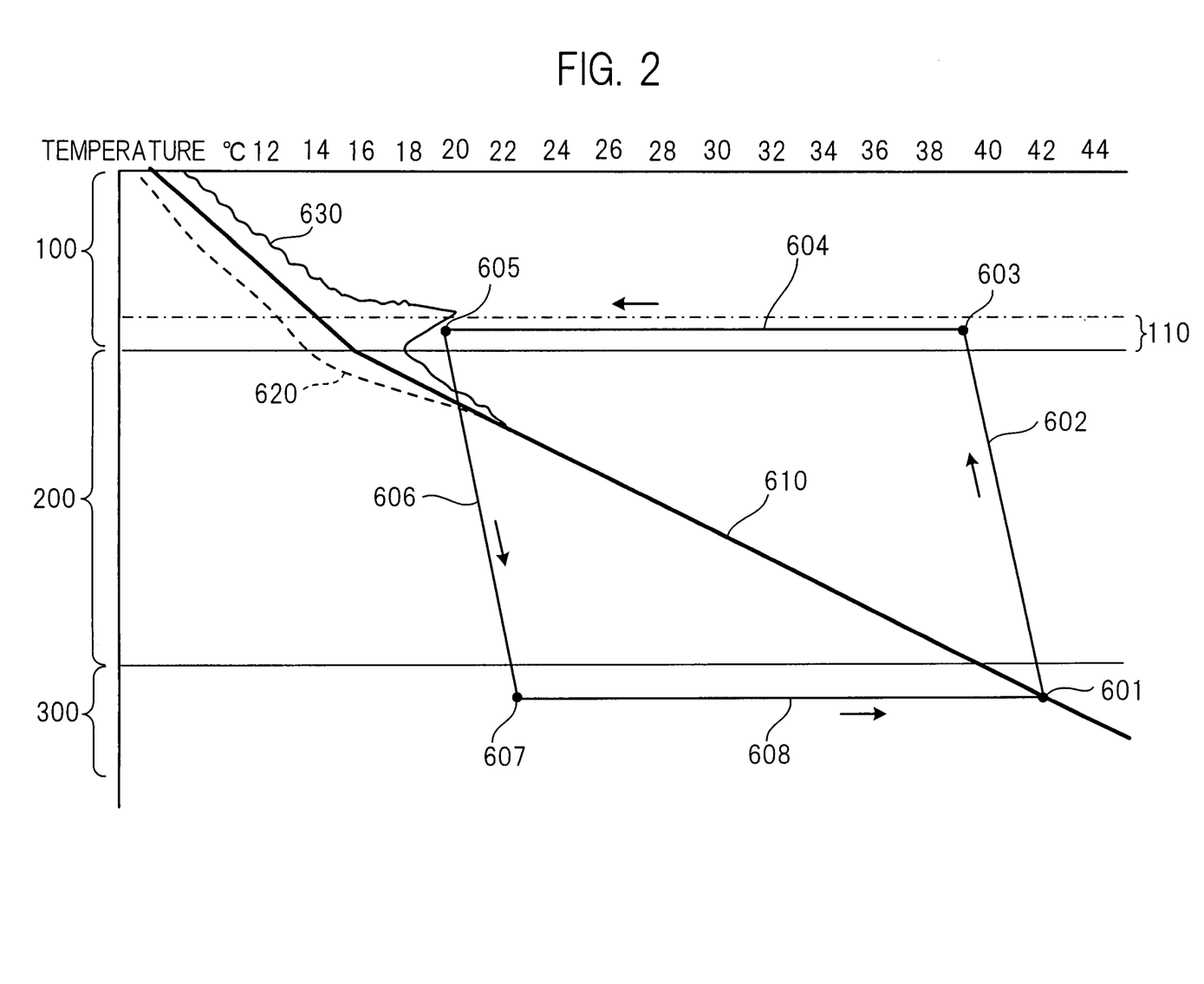
FIG. 2 is a graph schematically showing an example of layer and fluid temperature conditions.

FIG. 2 is a graph schematically showing a mechanism of the methane gas collecting system according to the present invention using deep ground heat and an example of layer and fluid temperature conditions. Since demonstration cannot be performed at the present stage, this graph is created on the basis of basic knowledge.

The depth of the methane hydrate layer 100, the methane hydrate unsaturated layer 200, and the deep aquifer 300 is plotted on the ordinate and temperature is plotted on the abscissa. A ground temperature gradient line 610 and heat cycle diagrams (601 to 608) of the methane gas dissociating and collecting system according to the present invention are schematically shown.

When the depth of water is 1,000 m, the ground temperature gradient line 610 is predicted in a section from the seabed to the deep aquifer 300. Therefore, a ground temperature of about 42° C. is expected near the deep aquifer 300. A process for pumping up the heat medium from the deep aquifer (a point 601) with the pump and discharging the heat medium to a sand layer 110 near the dissociation boundary surface in the lower part of the methane hydrate layer is indicated by a line 602. The temperature of the heat medium at an end point 603 of the line is about 40° C. A point 603 indicates the temperature of the heat medium at the time when the heat medium reaches near a dissociation front of the methane hydrate. As indicated by a line 604, the temperature falls to about 20° C. while the heat medium passes near the dissociation boundary surface. The heat medium emits thermal energy with a heat medium temperature difference of about 20° C. (40° C.→20° C.) and reaches an end point 605. The heat medium cooled to 20° C. is returned to the deep aquifer through a process of a line 606 by a pump or the like set in the return well. The temperature difference 20° C. is not an absolute requirement. In calculation, a heat quantity necessary for dissociation is satisfied even at heat efficiency of 30%.

Subsequently, the heat medium absorbs the ground heat as indicated by a line 608 while flowing through the deep aquifer 300 and recovers to a geothermal temperature of about 42° C. (the point 601). The ground heat is different depending on the location. When the thickness of the deep aquifer 300 is small or when it is desired to increase the thermal energy, it is preferable to use a slightly deeper aquifer.

In FIG. 2, a one-dimensional flow of the heat medium is schematically shown. However, actually, the heat medium flows two-dimensionally, for example, flows radially. Therefore, a temporal change of heat exchange is somewhat complicated.

A curve 620 qualitatively indicates a ground temperature change that occurs when production is continued by the simple depressurization method. Since the heat supply speed is low, the layer temperature falls according to dissociation. A curve 630 indicates prediction of the temperature of a layer fluid during production by the methane gas collecting system according to the present invention. The ground temperature can be somewhat increased if geothermal energy equal to or higher than heat involved in dissociation is absorbed by the methane hydrate layer. Fluid temperature near the dissociation boundary surface that affects productivity can be controlled according to a pump rate.

Figure 3:
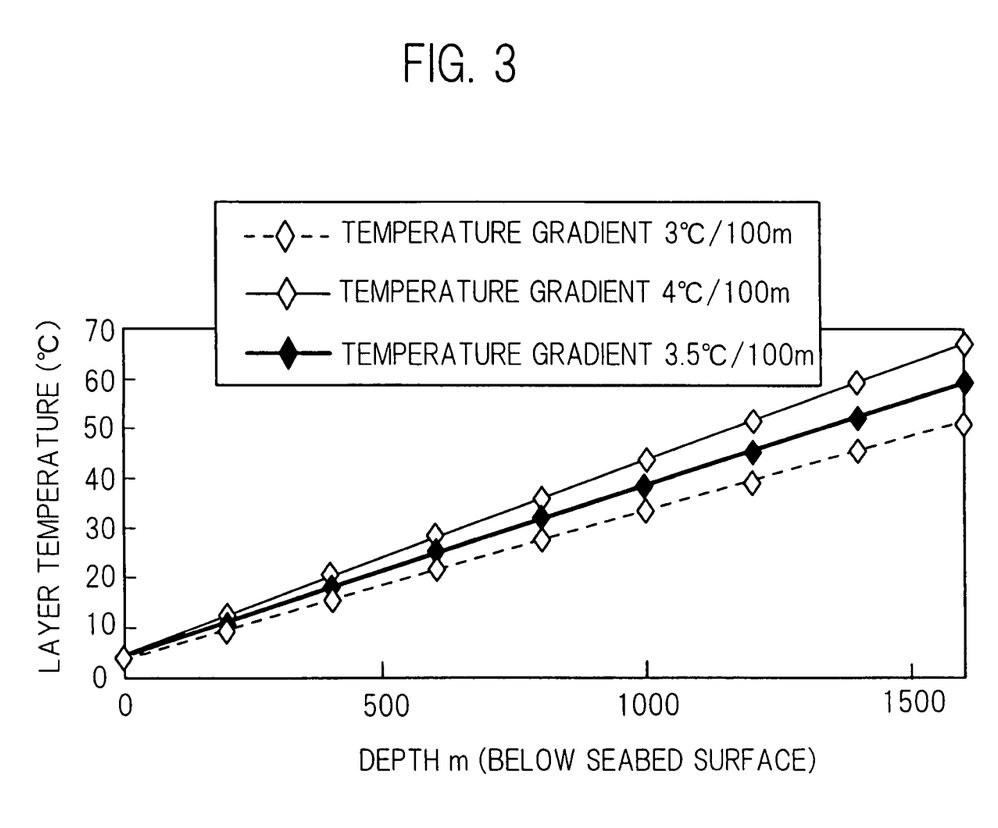
FIG. 3 is a graph showing a relation between depth and layer temperature.

FIG. 3 is a graph showing a relation between depth and layer temperature predicted in the offshore south sea. Since survey is not yet sufficient, numerical values shown in the graph are slightly different depending on the location. However, ground temperature gradient in a wide area is estimated as 3° C. to 4° C./100 m.

A relation between depth and pressure is considered to be a substantially linear relation and indicates that the layer temperature is under a layer condition of normal pressure up to near the depth 1,350 m.

Although there is a difference depending on the location in the offshore south sea, near the depth of water of 1,000 m, it is predicted that a mud layer is present up to 1,100 m, a sand and mud alternate layer is present below the mud layer, and the lower end of a methane hydrate concentrated area is near 1,350 m. The layer temperature at the lower end of the methane hydrate concentrated layer is considered to be about 14° C.

The dissociation boundary surface temperature at the lower end of the methane hydrate concentrated layer is considered to be about 16° C. according to a methane hydrate equilibrium curve. Therefore, a difference between the layer temperature and the boundary surface temperature at the lower end of the methane hydrate concentrated layer is estimated as about 2° C. Therefore, it is interpreted that an extremely inexpensive combination method is established if it is possible to supply warm water of about 40° C. without using fuel and efficiently perform heat exchange near the dissociation boundary surface.

According to FIG. 3, it is interpreted that warm water equal to or higher than 40° C. can be relatively easily secured from an aquifer at 1,000 m below the seabed or deeper. (When seabed temperature is 4° C. and ground temperature gradient is 4° C./100 m, the temperature of the aquifer at 1,000 m below the seabed is about 44° C. in calculation).

The layer pressure increases if forced injection of the warm water is continued. However, with production means based on the intra-layer circulating system according to the present invention, it is unnecessary to forcibly inject a high-pressure fluid. Therefore, it is possible to eliminate accumulation of pressure in the methane hydrate layer. If the permeability of the aquifer is sufficient, gentle warm water circulation by a single-phase down-hole pump can be expected.

Figure 4:
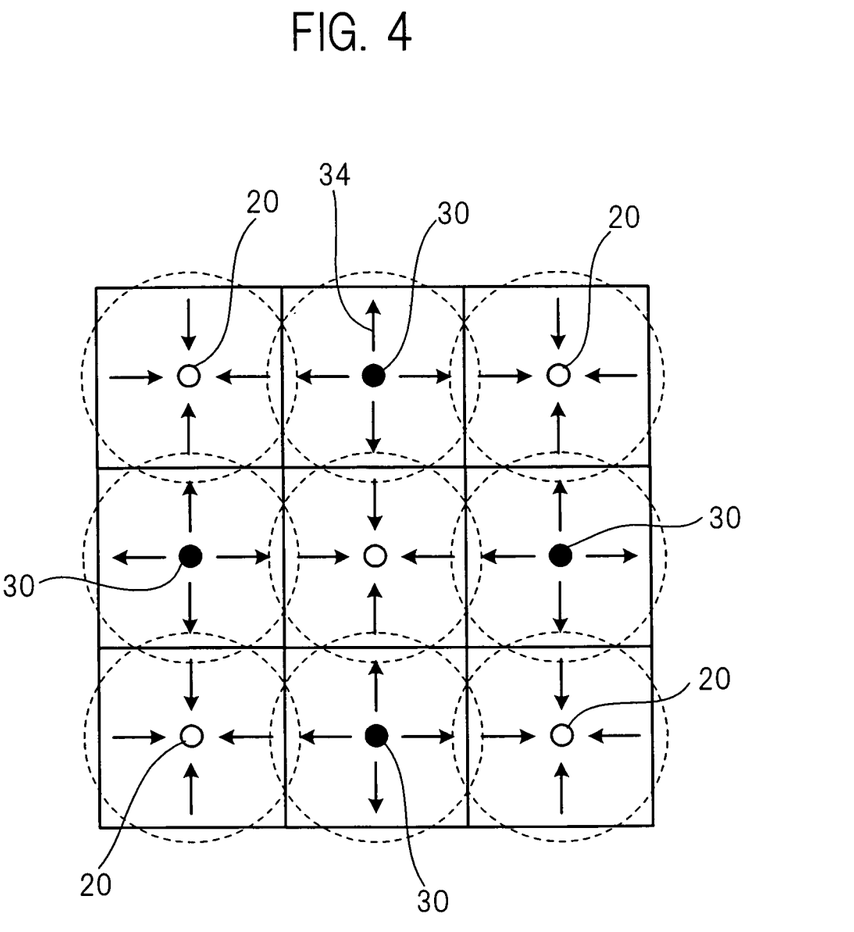
FIG. 4 is a schematic plan view showing a circulating path of warm water between a heating well and a return well.

FIG. 4 is a plan view schematically showing a moving path of the heat medium that reaches from the top of the heating well 30 shown in FIG. 1 to the lower bottom of the return well 20 through near the methane hydrate layer dissociation boundary surface. In FIG. 4, these wells are equally arranged in plane and a flat area of the methane hydrate layer, from which methane gas is collected, is shown as a square for convenience. A flowing direction of the heat medium in plane depends on a well position, temperature gradient, anisotropy, layer inclination, physical pressure gradient of a layer, gravity, permeability, and the like. The flowing direction only has to be capable of transferring geothermal energy to the sand layer near the methane hydrate dissociation boundary surface. No matter how these wells are arranged, it is considered that the heat medium flows substantially radially along a layer surface as indicated by arrows.

Figure 5:
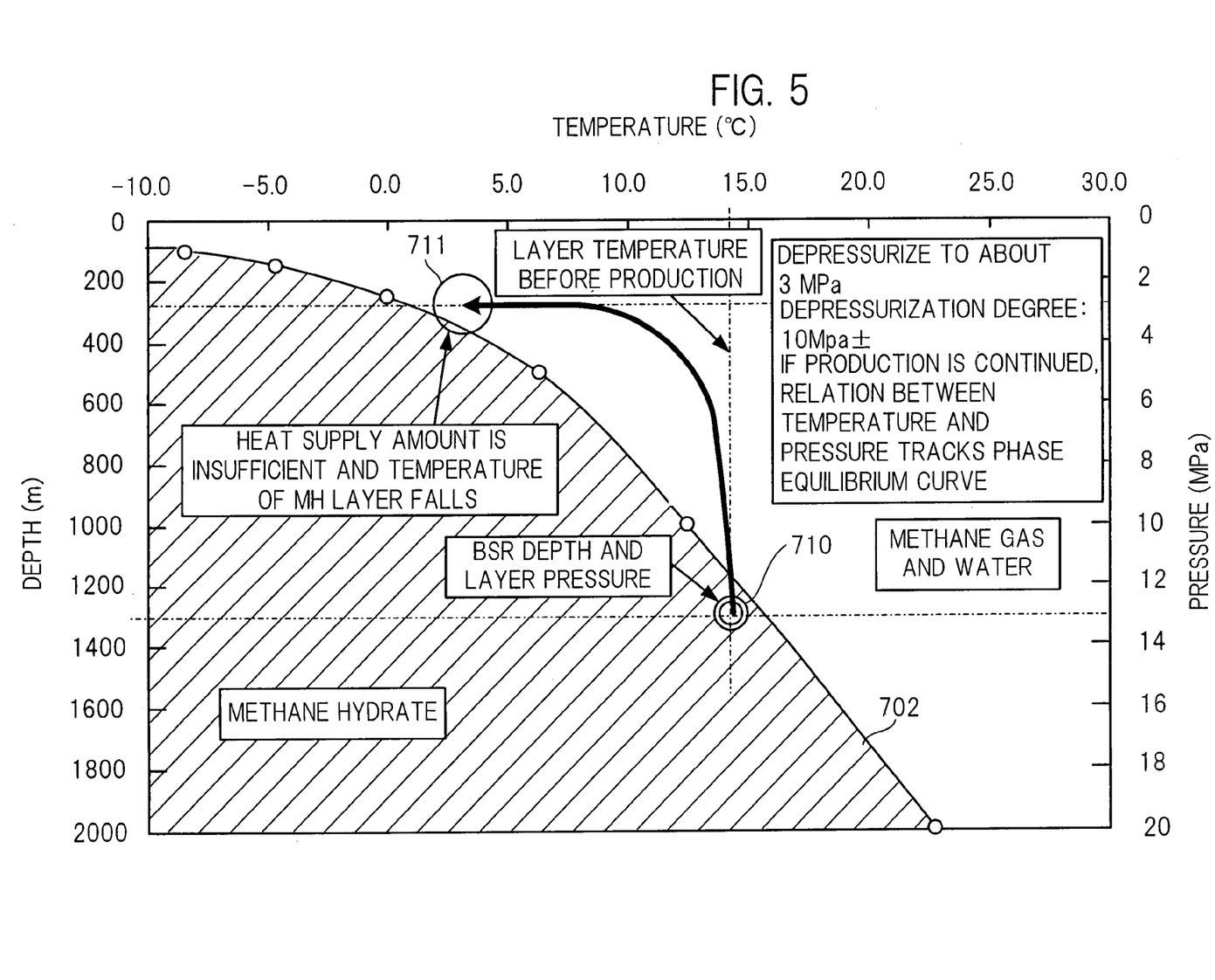
FIG. 5 is a graph showing a relation of a phase equilibrium curve.

FIG. 5 is a graph showing a relation between depth, pressure, and temperature of the methane hydrate layer predicted by the simple depressurization method and a phase equilibrium curve. A phase equilibrium curve 702 of methane hydrate is drawn with the depth indicated by a logarithmic scale on the ordinate and the temperature plotted on the abscissa.

A hatched area on the lower left side of the curve 702 is a solid phase area of the methane hydrate. An area further on the upper right side than the curve 702 is a methane gas area. An area further on a low temperature side than 0° C. is a mixed area of methane gas, water, and ice. An area further on a high temperature side than 0° C. is a mixed area of methane gas and water. A scale of pressure is marked on the ordinate in addition to the depth.

For example, the temperature of the methane hydrate layer at the depth of 1,000 m is about 14° C. When the pressure is reduced to about 3 MPa, the methane hydrate layer changes to a state of a point 710 and the methane hydrate can be collected as gas. However, since supply speed of heat is low, satisfactory productivity cannot be maintained and the methane hydrate layer reaches a point 711 involving a temperature fall. Therefore, vaporization is hindered and productivity markedly falls.

In the simple depressurization method, although initial productivity is satisfactory, a heat supply amount falls as time elapses. In the beginning of production, heat is supplied from the upper part of the methane hydrate and the mud layer that forms the alternate layer with the methane hydrate layer. However, the upper part of the methane hydrate and the mud layer do not have re-productivity, insufficiency of heat becomes obvious while production is continued.

The heat supply from the lower part of the methane hydrate layer is maintained until the production is ended. However, since the transfer speed is low, the layer temperature falls and the temperature and pressure conditions of the dissociation boundary surface approach a boundary line of the phase equilibrium curve. Consequently, a sudden decrease in productivity becomes inevitable. Therefore, a shape of production behavior is deteriorated, causing a fall in use efficiency of the facility and an increase in building cost.

Figure 6:
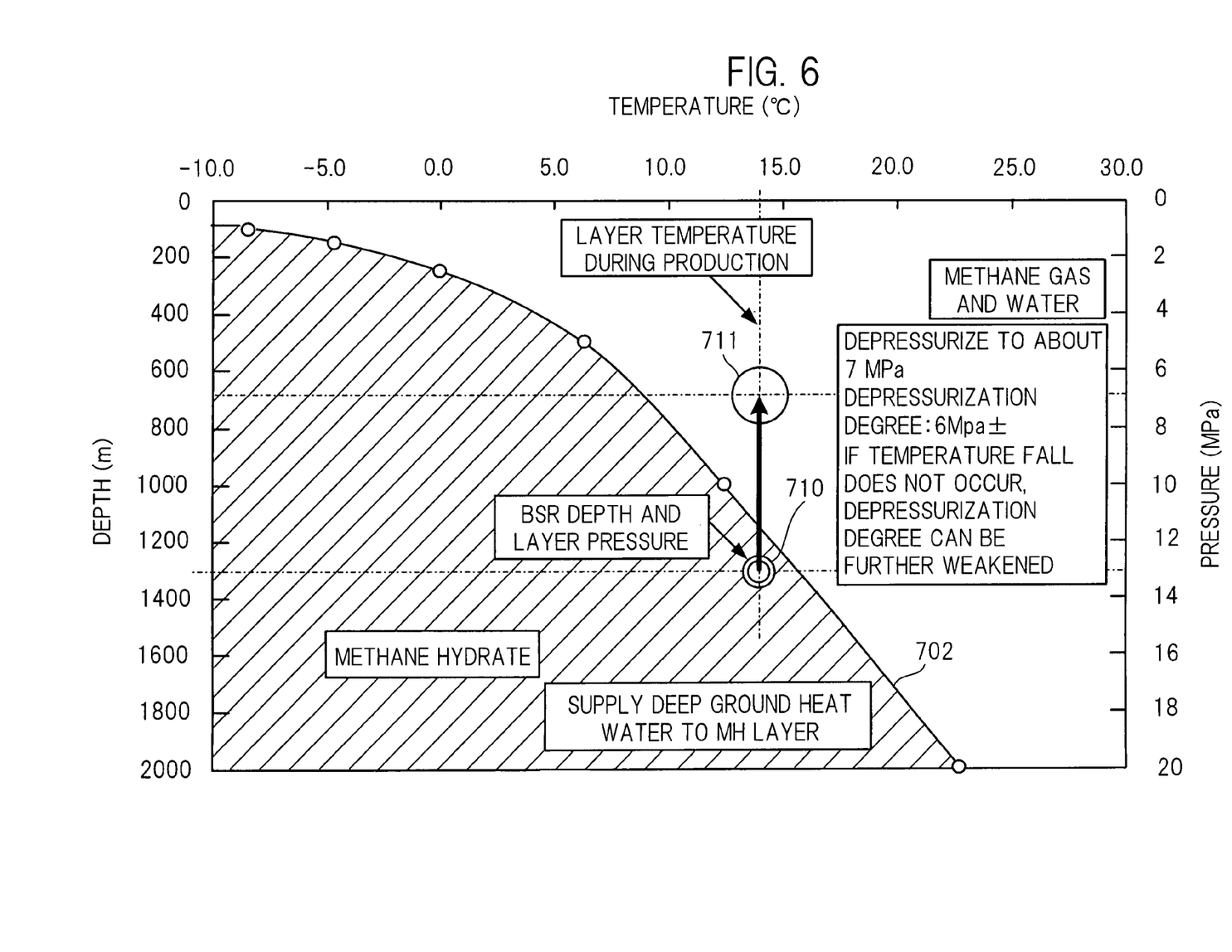
FIG. 6 is a graph showing a relation of a phase equilibrium curve according to the embodiment.

FIG. 6 is a graph showing behavior based on a phase equilibrium curve performed when the methane gas collecting system according to the present invention is used. Scales are set in the same manner as FIG. 5. In the present invention, it is possible to maintain production with depressurization up to about 7 MPa by deriving geothermal energy in the depth using the pump and directly supplying the geothermal energy to the dissociation boundary surface of methane hydrate. Since sufficient heat can be continuously supplied, a temperature fall does not occur and it is possible to prevent a sudden fall in productivity.

Maintenance of a stable production level can be performed by adjusting the supply speed of the geothermal energy. Peak production can be suppressed by relaxing a depressurization degree. Specifically, leveling of productivity is established by securing productivity adjusting means in two systems. Therefore, it is possible to remarkably reduce the design of a production facility. At the same time, a reduction in a discharge amount of sand and water is realized.

Figure 7:
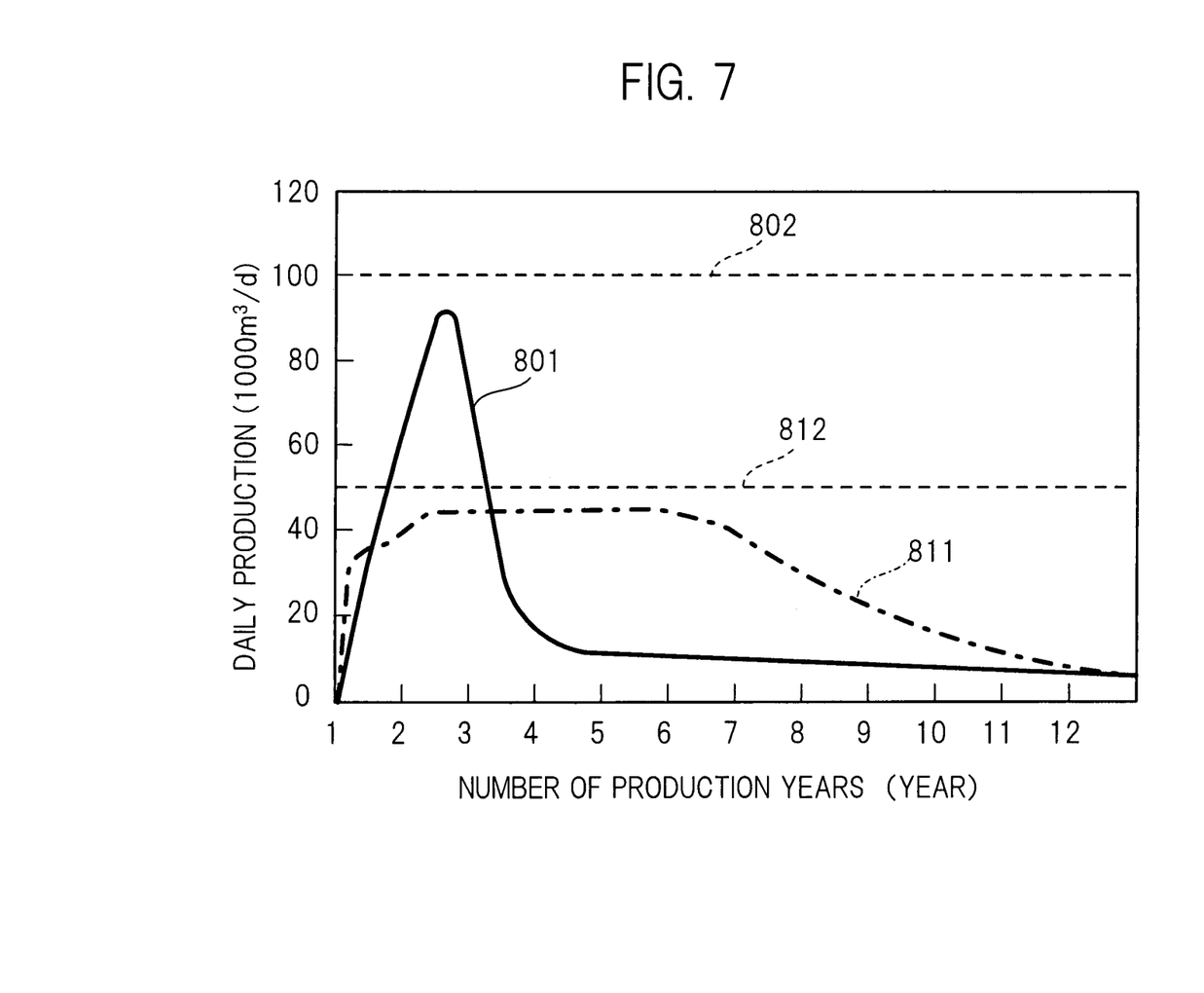
FIG. 7 is a graph showing a secular change of a daily production.

FIG. 7 is a graph in which a secular change 801 of daily production predicted by the depressurization method at fixed well bottom pressure is compared with a secular change 811 of daily production expected by this producing system that makes use of deep ground heat. The ordinate indicates daily production of a well and the abscissa indicates the number of production years. In the simple depressurization method with fixed well bottom pressure, as indicated by a line 801, the daily production suddenly increases in the beginning of production. However, even if intense depressurization is continued at the fixed well bottom pressure, the daily production rapidly falls.

With the system according to the present invention, it is possible to hold down a level of a production peak by suppressing the depressurization degree and maintain long-term stable plateau production by continuously supplying geothermal energy while controlling heat quantity.

Specifically, it is possible to rectify the production behavior curve by the depressurization method like a line 811 by suppressing the depressurization degree and controlling a supply amount of the geothermal energy.

In this example, a design specification line 802 of an apparatus depending on the production behavior curve of the depressurization method changes as indicated by a line 812 by the adoption of this system. As a result, design specifications of the sub-sea system are reduced and, on the other hand, average productivity increases. A recovery ratio is obviously improved in an automatic calculation result by an economy model to which the production behavior curves 801 and 811 are input.

This means that building cost for the production facility is substantially reduced and, on the other hand, gas sales revenue is increased and thus, a remarkable economic effect can be expected.

Figure 8:
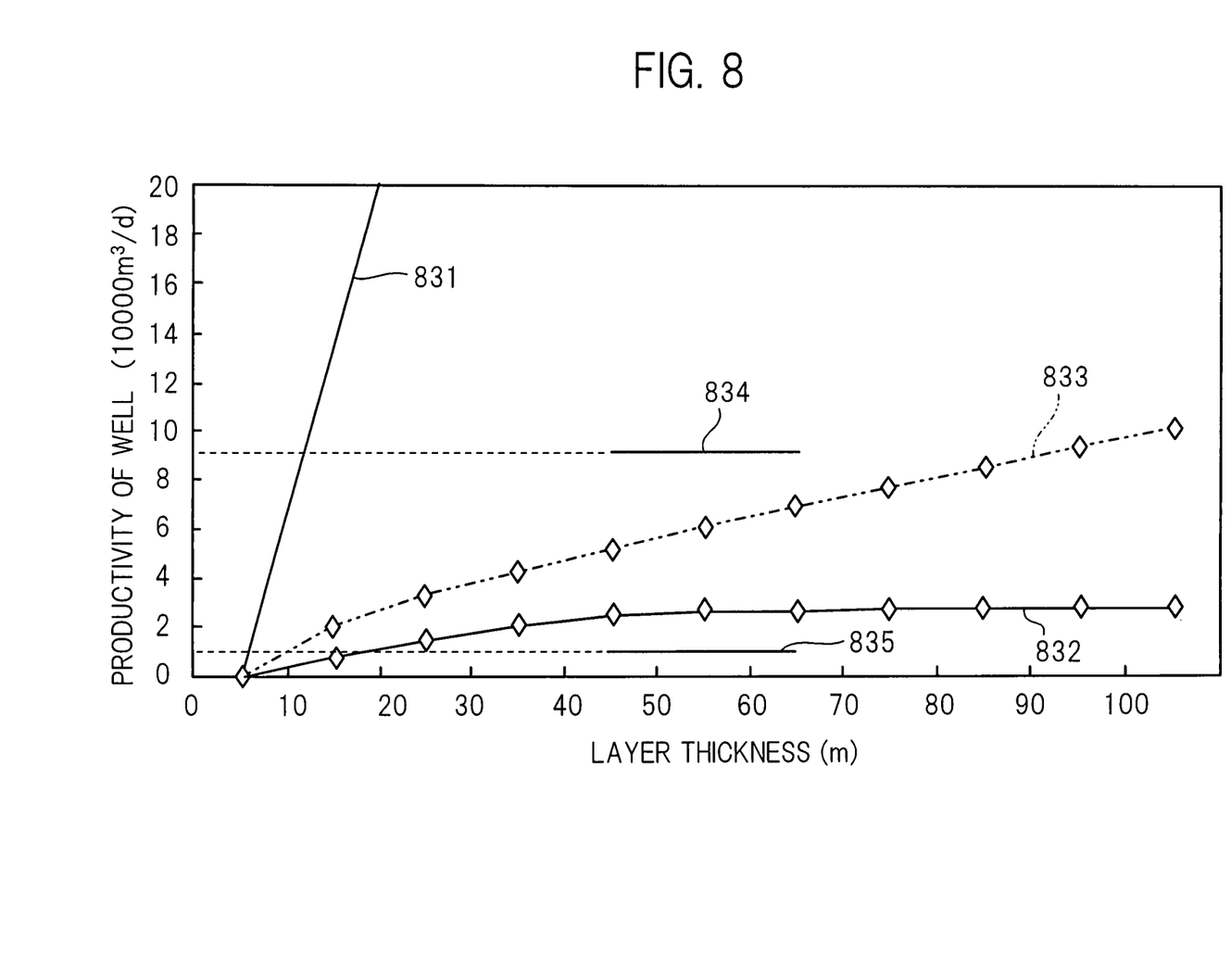
FIG. 8 is a graph showing a relation between layer thickness and productivity.

FIG. 8 is a graph showing a relation between the thickness of the methane hydrate layer and productivity predicted by the depressurization method and room for improvement of productivity. The layer thickness of methane hydrate is plotted on the ordinate and productivity of a well is plotted on the abscissa. A curve 832 indicates a productivity prediction value of the depressurization method. In the depressurization method, when the thickness exceeds a thickness at which insufficiency of supply of heat begins, an increase in the thickness does not contribute to productivity and only a ratio of an un-dissociated area increases. In other words, even if the sea is rich in thick methane hydrate, the advantage cannot be sufficiently utilized for improvement of productivity.

On the other hand, when the methane gas collecting system according to the present invention that makes use of deep ground heat is used, the supply of heat is accelerated. Therefore, expansion of the un-dissociated area is prevented. When the thickness of the methane hydrate layer increases, the advantage can be directly utilized for improvement of productivity. A line 833 indicates an upper limit value expected by this system that supplies geothermal energy. An area between the line 834 and the line 835 indicates an expected area that changes according to a supply amount of heat. However, quantitative verification of the area cannot be performed at the present stage.

A line 831 indicates productivity of average conventional gas productivity in the ocean.

In the conventional gas development, in general, as layer thickness is larger, productivity is improved and, as a result, economy is also improved. The present production system is basically developed for the purpose of acceleration of dissociation speed of methane hydrate and, at the same time, attempts to acquire the benefit of the thickness of a resource layer in the same manner as the conventional gas development.

The invention claimed is:

1. A methane hydrate dissociation accelerating and methane gas deriving system for deriving methane gas from a methane hydrate layer that is located under a seabed and includes a sand layer in a lower part of the methane hydrate layer, the system comprising:
 a first production well that extends from the seabed to the methane hydrate layer and that collects the methane gas from the methane hydrate layer;
 a second production well that extends from a location on the seabed, which is separated from a location on the seabed of the first production well, to the methane hydrate layer and that collects the methane gas from the methane hydrate layer;
 a heating well that extends in a lower direction toward an aquifer as an extension of a lower part of the first production well, the heating well being configured to pump a heat medium from the aquifer to supply the heat medium in a vicinity of a disassociation boundary surface in the methane hydrate layer; and
 a return well that extends in a lower direction toward the aquifer as an extension of a lower part of the second production well and that is different from the heating well, the return well being configured to return the heat medium from the methane hydrate layer to the aquifer after the heat medium has been subjected to heat transfer while passing in the vicinity of the disassociation boundary surface; wherein the heating well causes the heat medium to flow through the sand layer and the return well forms a circulating path of the heat medium, together with the heating well, the sand layer, and the aquifer.

2. The methane hydrate dissociation accelerating and methane gas deriving system according to claim 1, wherein the first production well is configured to reduce pressure of the methane hydrate layer.

* * * * *